United States Patent
Drenguis

(10) Patent No.: US 8,756,902 B2
(45) Date of Patent: Jun. 24, 2014

(54) METHOD AND APPARATUS FOR HANDLING WORKPIECE

(75) Inventor: Alfred Drenguis, Börnsen (DE)

(73) Assignee: KHS GmbH, Dortmund (DE)

(*) Notice: Subject to any disclaimer, the term of this patent is extended or adjusted under 35 U.S.C. 154(b) by 346 days.

(21) Appl. No.: 13/131,749

(22) PCT Filed: Dec. 16, 2009

(86) PCT No.: PCT/EP2009/009002
§ 371 (c)(1),
(2), (4) Date: May 27, 2011

(87) PCT Pub. No.: WO2010/088940
PCT Pub. Date: Aug. 12, 2010

(65) Prior Publication Data
US 2011/0225934 A1    Sep. 22, 2011

(30) Foreign Application Priority Data

Feb. 6, 2009   (DE) .......................... 10 2009 007 906
Feb. 6, 2009   (DE) .......................... 10 2009 007 907

(51) Int. Cl.
  *B65B 1/04*   (2006.01)
(52) U.S. Cl.
  USPC ................. 53/471; 53/287; 53/317; 53/329
(58) Field of Classification Search
  USPC ......... 53/471, 287, 317, 329, 329.3; 215/395; 294/86.4; 428/35.7
  See application file for complete search history.

(56) References Cited

U.S. PATENT DOCUMENTS

| | | | |
|---|---|---|---|
| 5,711,913 A * | 1/1998 | Seki et al. | 264/532 |
| 5,803,281 A | 9/1998 | Towns | |
| 6,673,303 B2 * | 1/2004 | White et al. | 264/524 |
| 2002/0167185 A1 | 11/2002 | Graffin | |
| 2003/0116522 A1 | 6/2003 | Julian et al. | |
| 2003/0186006 A1 | 10/2003 | Schmidt et al. | |
| 2004/0187444 A1 * | 9/2004 | Hutchinson et al. | 53/453 |
| 2005/0121452 A1 * | 6/2005 | Stoltz | 220/258.2 |
| 2007/0045216 A1 | 3/2007 | Gami et al. | |
| 2007/0235477 A1 | 10/2007 | Penny et al. | |
| 2009/0000909 A1 * | 1/2009 | Hollriegl et al. | 198/377.03 |
| 2009/0273118 A1 * | 11/2009 | Blochmann et al. | 264/277 |
| 2010/0178148 A1 | 7/2010 | Forsthoevel et al. | |
| 2011/0100946 A1 * | 5/2011 | Perra | 215/40 |
| 2011/0132892 A1 * | 6/2011 | Winzinger et al. | 219/420 |

FOREIGN PATENT DOCUMENTS

| | | |
|---|---|---|
| AT | 005071 | 2/2002 |
| DE | 3713016 | 10/1988 |
| DE | 20009075 | 7/2001 |
| DE | 102007033621 | 7/2007 |
| DE | 102006012020 | 9/2007 |
| DE | 102007002596 | 7/2008 |

(Continued)

*Primary Examiner* — Hemant M Desai
(74) *Attorney, Agent, or Firm* — Occhiuti & Rohlicek LLP

(57) ABSTRACT

The container has a bottle-like shape and is made of thermoplastic material. The container is provided with a mouth section which has a fixing ring (3) on the outside. The pre-form is provided for the production of such a container. Both the pre-form and the container produced therefrom are designed without any supporting ring. In order to enable handling, an associated holding device (12) acts on a fixing ring (3) of the pre-form or the container.

12 Claims, 5 Drawing Sheets

(56) References Cited

FOREIGN PATENT DOCUMENTS

| | | | | |
|---|---|---|---|---|
| DE | 102007024102 | 11/2008 | | |
| IT | 20070552 | 10/2007 | | |
| JP | 2000128161 A | * 5/2000 | ............... | B65D 6/10 |
| WO | 02/098755 | 12/2002 | | |

* cited by examiner

METHOD AND APPARATUS FOR HANDLING WORKPIECE

CROSS-REFERENCE TO RELATED APPLICATIONS

This application is the National Stage of International Application No. PCT/EP2009/009002, filed on Dec. 16, 2009, which claims the priority of German Patent Application No. 10 2009 007 906.8, filed on Feb. 6, 2009 and German Patent Application No. 10 2009 007 907.6, filed on Feb. 6, 2009. The contents of all the foregoing applications are hereby incorporated by reference in their entirety.

FIELD OF INVENTION

The invention relates to a container having a bottle-like shape produced from a blow-moulded thermoplastic material, said container being provided with a mouth portion and a fixing ring.

BACKGROUND

Over and above this, the invention relates to a preform for producing a container having a bottle-like shape produced from a thermoplastic material, said preform being provided with a mouth portion and a fixing ring.

The invention additionally relates to an instrument having a holding device for handling workpieces produced from a thermoplastic material, said workpieces having a mouth portion and a fixing ring.

Finally, the invention relates to a method for handling workpieces produced from a thermoplastic material, said workpieces having a mouth portion and a fixing ring.

Such preforms are typically produced in an injection moulding method and are realized from suitable materials, for example PET or PP. To make handling the preforms easier when carrying out a blowing operation, when the blown containers are being transported and when the filling operation is being carried out, corresponding preforms and containers are usually realized with so-called supporting rings. These supporting rings are located in a region between a mouth portion of the container and a shoulder of the container and are usually integrally moulded in one piece on the preform when the injection moulding operation is carried out.

On account of constantly rising raw material prices as well as on account of aesthetic standpoints, efforts have already been made to realize preforms and blow-moulded containers with scaled-down supporting rings or without any supporting rings. However, these types of structures, known for a long time, have not proved to be sufficiently fit for purpose in order to support simple and at the same time reliable handling.

SUMMARY

It is the object of the present invention, consequently, to design a container of the type named in the introduction in such a manner that a simple and material-saving production process and simple and reliable handling are supported.

This object is achieved according to the invention in that the mouth portion is realized without any supporting ring between the fixing ring and a shoulder of the container.

It is a further object of the present invention to realize a preform of the type named in the introduction in such a manner that the production of a container without any supporting ring is supported.

This object is achieved according to the invention in that the mouth portion is realized without any supporting ring between the fixing ring and a shoulder of the container.

It is an additional object of the present invention to realize an instrument of the type mentioned in the introduction in such a manner that the handling of preforms without any supporting rings is possible.

This object is achieved according to the invention in that the holding device is realized for impinging upon the fixing ring.

Finally it is an object of the present invention to provide a method for handling workpieces without any supporting rings.

This object is achieved according to the invention in that the workpiece is held by a holding device in the region of the fixing ring.

It has been recognized according to the invention that the fixing ring, which is located according to the prior art between the supporting ring and a threaded portion of the preform or a mounting profile for closures developed in another manner, can be used as a mounting profile for handling the preforms and the containers. Said fixing ring usually serves as a retaining ring once the screw-type closures have been placed in position and is engaged behind by a ring-like profile that is integrally moulded on the screw-type closure. The first time the closure is opened, said mounting profile begins to tear and it is directly detectable by the user that the container is no longer closed by means of its original closure.

Consequently, in a common embodiment, the mouth portion of usual preforms and containers includes a thread, the fixing ring that is located at a small spacing from the thread and in addition the supporting ring that is located at a further spacing both from the fixing ring and from the thread.

Leaving out the supporting ring and utilizing the fixing ring as a mounting profile ensures more secure and reliable handling of the preforms and the containers without the need for an additional laterally protruding supporting ring. Consequently, on the one hand a saving is made on the material of the supporting ring and, over and above this, greater shaping possibilities from an aesthetic view point are opened up.

A simple production process is supported by the fact that the mouth portion is injection moulded.

A high level of material strength is supported by the fact that the securing ring is produced by means of an injection moulding operation.

Expedient guiding can be realized by the fact that the handling device is realized for impinging upon the fixing ring in the region of a side of the workpiece that is remote from the mouth portion.

Following a filling of the container it is conceived, in particular, that the holding device is located adjacent a device for placing closure caps onto the workpiece.

For the process of making available original closures, it is proposed that by means of a relative movement towards the fixing ring, the holding device supports the latching of a mounting profile of the closure cap below the fixing ring.

According to a typical embodiment, it is possible for the holding device to be realized for impinging upon preforms, which are provided for producing blow-moulded containers.

Over and above this, it is also conceived that the holding device is realized for impinging upon blow-moulded containers.

BRIEF DESCRIPTION OF THE DRAWINGS

Exemplary embodiments of the invention are shown schematically in the drawings, in which.

DETAILED DESCRIPTION

Figure 1:
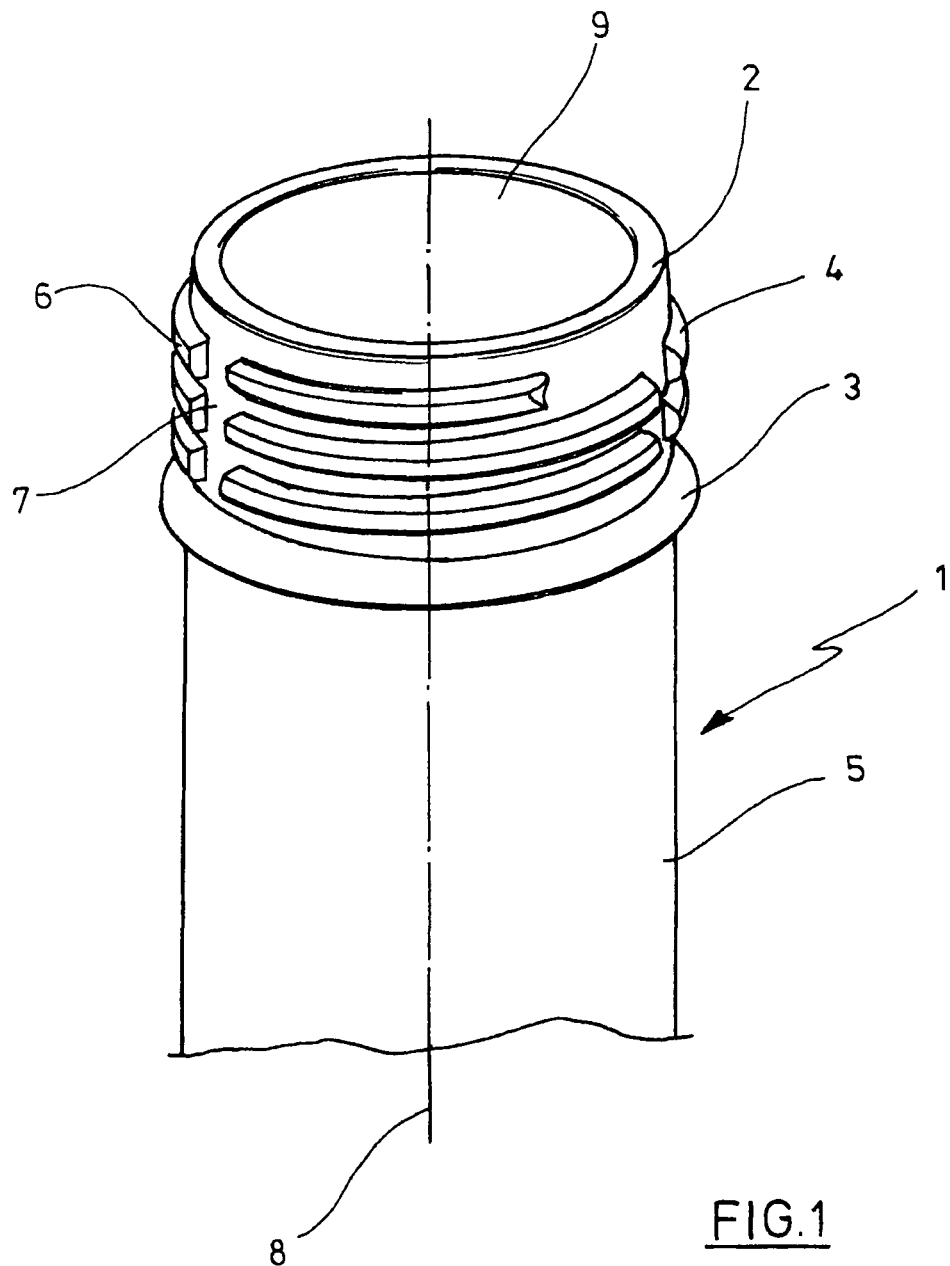
FIG. 1 shows a perspective partial representation of a preform with thread and fixing ring in the mouth portion.

In the case of the embodiment in FIG. 1, a preform (1), represented purely in part and in a side view, is provided in the region of a mouth portion (2) with a circumferential fixing ring (3) on the outside. The fixing ring (3) extends between a threaded portion (4) and a side wall region (5) of the preform (1). The threaded portion (4) is provided with an external thread (6).

The fixing ring (3) is typically created when the preform (1) is produced in an injection moulding method. The fixing ring (3) and the external thread (6) are integrally moulded to the preform (1) in one piece.

The fixing ring (3) protrudes laterally beyond a surface of the preform (1) with a sizing that corresponds substantially to the thread pitch of the external thread (6) in this direction, preferably however somewhat greater.

In the case of preforms (1) that are provided to form containers that are to accommodate pressurized liquids, for example carbonated beverages, one or more vent grooves (7) are located in the region of the external thread (6), said vent grooves extending in a longitudinal direction (8) of the preform (1) and interrupting the spiral-like thread pitch. This means that it is possible to reduce the pressure in the interior of the container with the closure cap still placed in position and just loosened.

In the region of its extension remote from the fixing ring (3), the mouth portion (2) defines an opening (9) of the preform (1).

Figure 2:
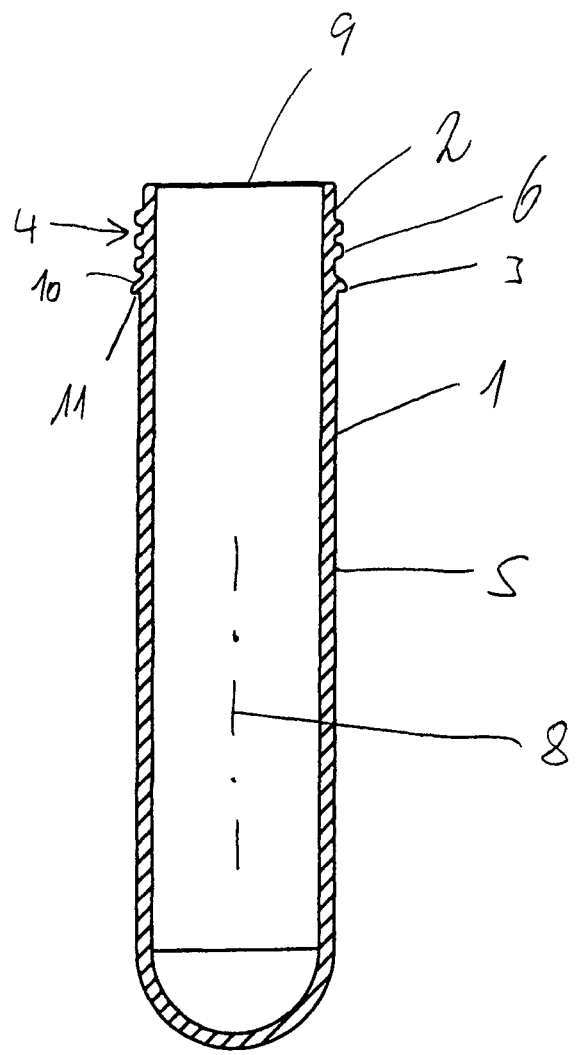
FIG. 2 shows a longitudinal section through a preform similar to the embodiment in FIG. 1.

FIG. 2 shows a longitudinal section through the preform (1). It is made clear in particular that the fixing ring (3) is provided with a feed inclination (10) in the region of its extension facing the external thread (6) and with a shoulder (11) in the region of its extension remote from the external thread (6).

Figure 3:
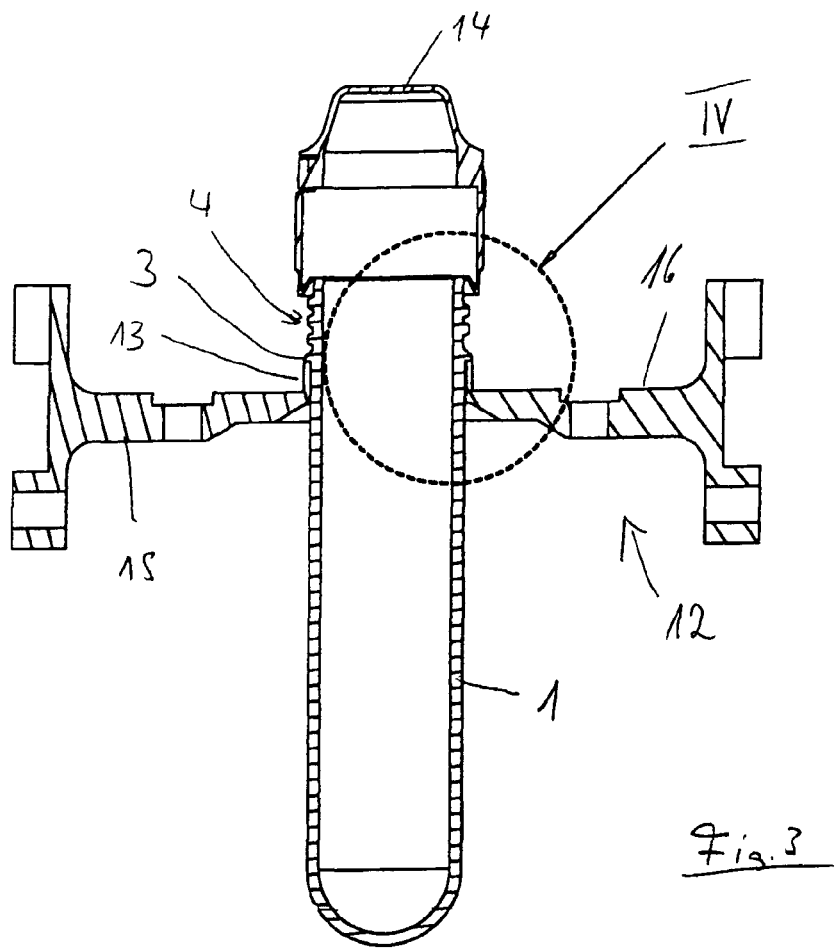
FIG. 3 shows a longitudinal section through a preform held by a handling device in the region of its fixing ring, with a closure cap placed loosely in position.

FIG. 3 shows the preform (1) in an arrangement in the region of a holding device (12). The holding device (12), in this case, supports the preform (1) in the region of a fixing ring (3) by way of a flange (13). In particular, here the idea is to realize the flange (13) as a curved segment that extends along a circumference of the preform (1) at least in a regional manner.

A closure cap (14) is placed loosely in position on the mouth portion (2) of the preform (1). The preform (1) is represented in FIG. 3 as an example of a workpiece to be held. The idea here, in particular, is also to position a container in the region of the holding device (12) and to support it in the region of its fixing ring (3), which has been produced by deforming the preform (1) in a blow-moulding operation.

The holding device (12) can be realized in different embodiments and, for example, can be located in the region of a blowing machine or in the region of a filling machine or in the region of conveying devices. For example, it is possible to design the holding device (12) from two mounting segments (15, 16). According to one embodiment, the mounting segments (15, 16) can be located at a spacing one relative to the other, said spacing corresponding to an outside diameter of the preform (1) in order to make a guide rail available in this manner. According to another embodiment, the mounting segments (15, 16) form parts of a pincer-like holding device (12) that are arranged so as to be moveable one relative to another.

Figure 4:
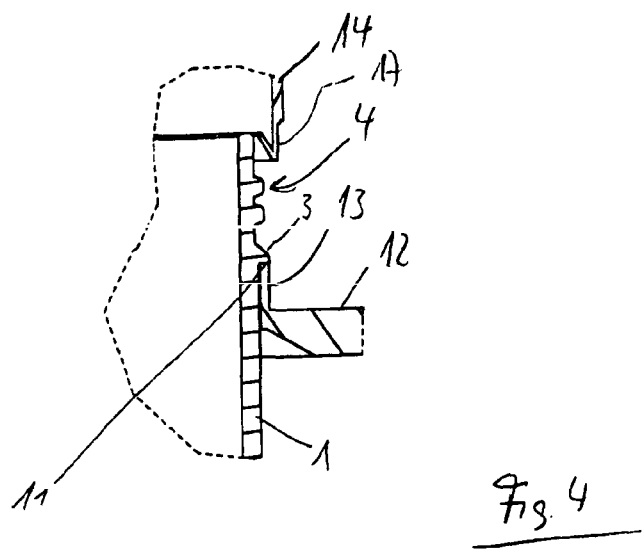
FIG. 4 shows an enlarged representation of the detail IV in FIG. 3.

FIG. 4 shows an enlarged representation of the detail IV in FIG. 3. It can be seen in particular that the flange (13) supports the fixing ring (3) in the region of the shoulder (11). A mounting profile (17) can be seen in the region of the closure cap (14). The mounting profile (17) essentially comprises a web that is curved inwards into the closure cap (14), making an inclined leading face available.

Figure 5:
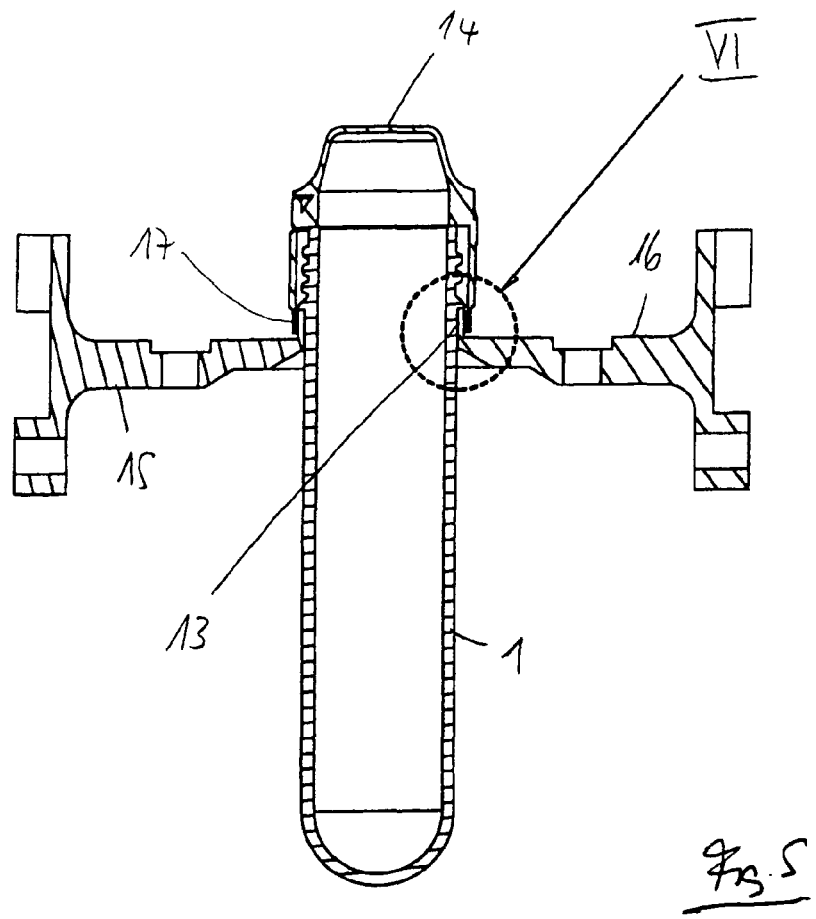
FIG. 5 shows the arrangement in FIG. 3 once the closure cap has been pushed onto the mouth portion, but before a mounting profile of the closure cap has been latched behind the fixing ring.

FIG. 5 shows the arrangement in FIG. 3 once the closure cap (14) has been completely pushed onto the preform (1). The mounting profile (17) is located outside the flange (13) in this operating state.

Figure 6:
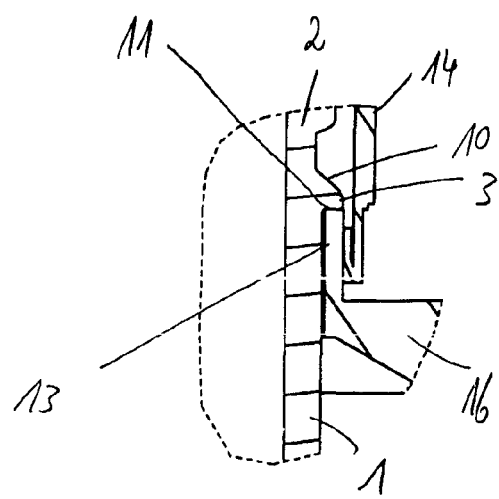
FIG. 6 shows an enlarged representation of the detail V in FIG. 5

FIG. 6 shows an enlarged representation of the detail VI in FIG. 5. It can be recognized that the mounting profile (17), after sliding along the feed inclination (10) of the fixing ring (3), has folded up in the manner of a spring and abuts against the flange (13) on the outside. The flange (13) is still guided against the shoulder (11) of the fixing ring (3) in this operating state.

Figure 7:
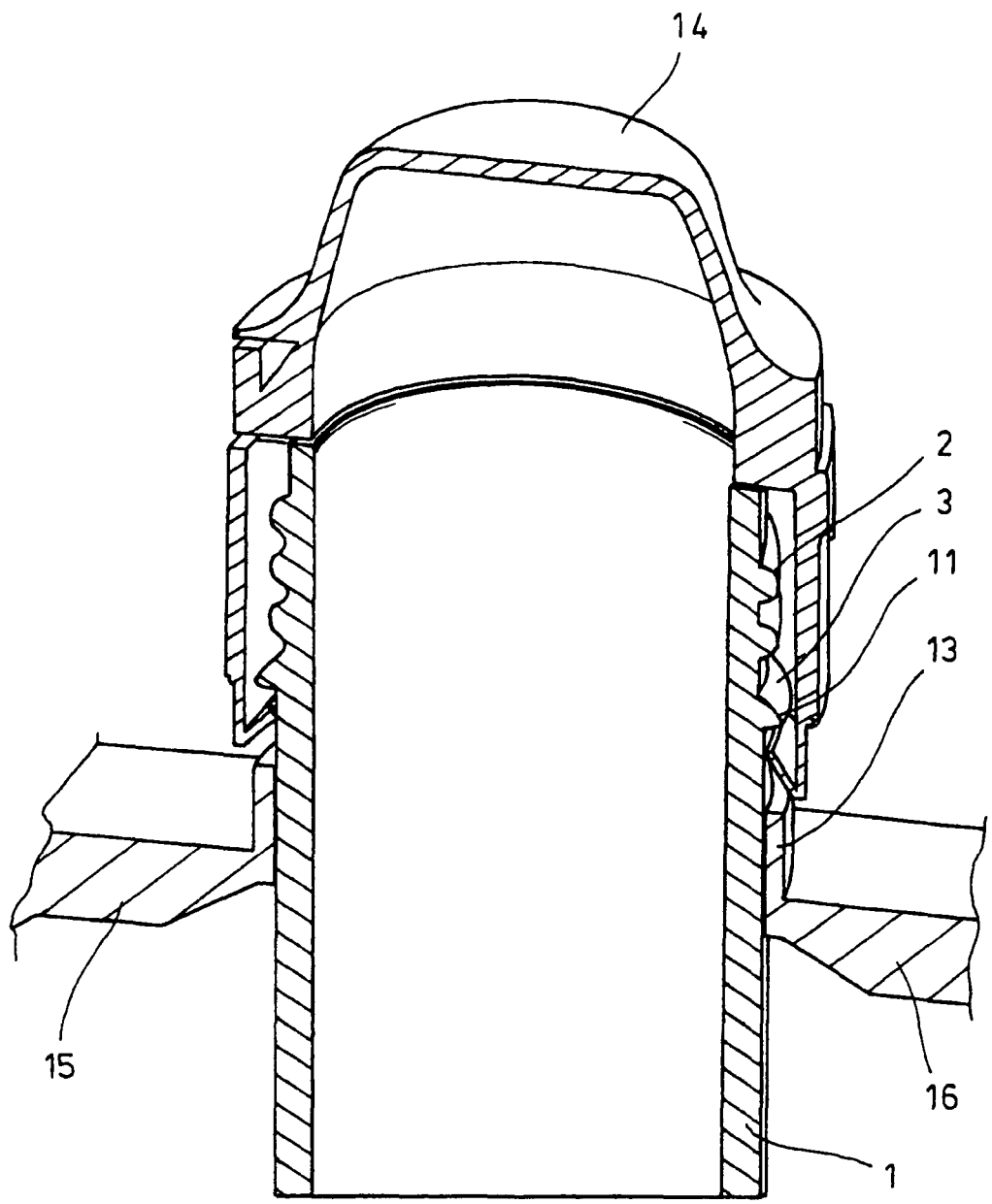
FIG. 7 shows a perspective partial representation of a longitudinal section through a preform with the closure cap placed in position and latched behind the fixing ring after the mounting device has been withdrawn.

FIG. 7 shows a partial representation of the arrangement in FIG. 5 once the flange (13) has been partially withdrawn in a direction facing away from the mouth portion (2). In so doing, the flange (13) has released the shoulder (11) of the fixing ring (3) such that the mounting profile (17) has been able to spring back in a v-shaped manner and in this way engages behind the shoulder (11) of the fixing ring (3). This means that the closure cap (14) is locked in the region of the preform (1). It must be pointed out once again at this point that the closing of the preform (1) has been represented purely as an example for the purposes of simplification and all operations described can also be carried out on a container to be closed.

The above-described withdrawing of the flange (13) to enable the securing lip of the mounting profile (17) to spring deflect can be realized by means of any suitable relative movement between the preform (1) or the blown container and the holding device (12). Usually, the moulded and filled bottle stands on a carrier element before being withdrawn when the flange (13) is withdrawn on a parallel axis. In principle, it is possible to lower the holding device (12), however an arrangement of the holding device (12) at a constant level combined with raising the closed container from the bottle support can be realized in a structurally simpler manner.

Where the holding device (12) is used in the region of blowing machines and/or in the region of filling machines, these types of machines can be provided both with a linear conveying means for the preforms or bottles and with rotating conveying wheels, blowing wheels and filling wheels.

The preform (1) or the blown container can be realized, for example, from PET (polyethylene terephthalate), PP (polypropylene) or PE (polyethylene).

The invention claimed is:

1. A method for handling workpieces produced from a thermoplastic material, the workpieces having a mouth portion and a fixing ring, the method comprising using a holding device to mount the workpiece in a region of the fixing ring, after the workpiece has been filled by a liquid product, closing the workpiece with a closure cap, and after having closed the workpiece, causing the closure cap to latch behind the fixing ring by way of a mounting profile after a relative movement between the workpiece and the flange.

2. The method of claim 1, further comprising supporting the fixing ring on a flange of the holding device in a region remote from the mouth portion.

3. The method of claim 1, further comprising using the holding device to hold a preform for the technical blow molding of containers.

4. The method of claim 1, further comprising using said holding device to hold a blow-molded container.

5. An apparatus comprising a fixture for handling workpieces made of thermoplastic material, wherein each of the workpieces has a mouth section and a fixing ring, said apparatus comprising a holding device for holding said workpiece, wherein said holding device is configured to impinge on said fixing ring along an area of a side thereof that faces away from said mouth section, wherein said holding device comprises a flange at a free end thereof, wherein said flange extends vertically upward along said workpiece up to a free end thereof, and wherein said flange is bent to follow a circumference of said workpiece along a circumferential zone thereof.

6. The apparatus of claim 5, wherein said holding device comprises two holding segments, each of which has a flange that extends vertically upward along said workpiece up to a free end thereof and that is bent to follow a circumference of said workpiece along a circumferential zone thereof.

7. The apparatus of claim 5, wherein said holding device is configured to support engagement of a mounting profile of a closing cap under said fixing ring through relative movement toward said fixing ring.

8. The apparatus of claim 7, wherein said holding device comprises a holding segment that carries said flange, wherein said flange has a width that extends in a radial direction and a height that extends between said free end of said fixture and said holding segment, wherein said width and said height are selected such that, after placing a closing cap on said workpiece, a holding profile of said closing cap first makes radial contact with an outside of said flange, and wherein, after said holding device is removed from said closing cap and said mouth section in an axial direction, said holding profile assumes an intended final shape and position that is opened and that reaches behind said fixing ring.

9. The apparatus of claim 5, wherein said holding device is arranged to be adjacent to a closing device for placing closing caps on said workpiece.

10. The apparatus of claim 5, further comprising closing a device for placing closing caps on said workpiece, wherein said holding device is arranged to be adjacent to said closing device.

11. The apparatus of claim 5, wherein said holding device is configured to impinge on pre-forms that are provided for production of blow-molded containers.

12. The apparatus of claim 5, wherein said holding device is configured to impinge on a blow-molded container.

* * * * *